(12) United States Patent  (10) Patent No.: US 8,157,643 B1
Phan  (45) Date of Patent: Apr. 17, 2012

(54) DIGITAL GAMING CHIP COUNTER

(76) Inventor: Toan Phan, Dublin, CA (US)

( * ) Notice: Subject to any disclaimer, the term of this patent is extended or adjusted under 35 U.S.C. 154(b) by 370 days.

(21) Appl. No.: 12/456,469

(22) Filed: Jun. 17, 2009

Related U.S. Application Data

(60) Provisional application No. 61/215,507, filed on May 6, 2009.

(51) Int. Cl.
*G06F 7/16* (2006.01)

(52) U.S. Cl. .................. 463/25; 273/148 R; 340/323 R

(58) Field of Classification Search .............. 463/25, 463/20; 273/148 R; 340/323 R
See application file for complete search history.

(56) References Cited

U.S. PATENT DOCUMENTS

| | | | | |
|---|---|---|---|---|
| 3,399,400 | A | * | 8/1968 | Lucka ........................ 340/323 R |
| 5,166,502 | A | | 11/1992 | Rendleman .................... 235/492 |
| 5,451,054 | A | * | 9/1995 | Orenstein ................ 273/148 R |
| 5,531,453 | A | * | 7/1996 | Penston, III .................. 273/440 |
| 5,770,533 | A | * | 6/1998 | Franchi ............................ 463/42 |
| 5,781,647 | A | | 7/1998 | Fishbone .......................... 382/1 |
| 5,788,574 | A | * | 8/1998 | Ornstein et al. ................ 463/25 |
| 5,894,261 | A | * | 4/1999 | Green ........................ 340/323 R |
| 5,909,793 | A | | 6/1999 | Beach et al. .................. 194/210 |
| 6,200,218 | B1 | * | 3/2001 | Lindsay ............................ 463/25 |
| 6,283,856 | B1 | * | 9/2001 | Mothwurf ....................... 463/17 |
| 6,629,889 | B2 | | 10/2003 | Mothwurf ........................ 463/25 |
| 6,873,355 | B1 | * | 3/2005 | Thompson et al. ............ 348/144 |
| 7,351,145 | B1 | * | 4/2008 | Ornstein et al. ................ 463/25 |
| 7,404,765 | B2 | | 7/2008 | Soltys et al. ..................... 463/25 |
| 7,460,079 | B2 | | 12/2008 | Koyama et al. ................ 343/788 |
| 7,559,839 | B2 | * | 7/2009 | Bahar .............................. 463/25 |
| 7,780,515 | B2 | * | 8/2010 | Okada ............................. 463/20 |
| 2003/0027629 | A1 | * | 2/2003 | Pimienta ........................ 463/25 |
| 2005/0035541 | A1 | * | 2/2005 | Oister et al. ............... 273/108.1 |
| 2005/0148391 | A1 | * | 7/2005 | Tain ................................ 463/42 |
| 2007/0054731 | A1 | * | 3/2007 | Okada ............................. 463/25 |
| 2008/0234025 | A1 | * | 9/2008 | Yoshizawa ...................... 463/11 |
| 2009/0075725 | A1 | * | 3/2009 | Koyama .......................... 463/25 |

FOREIGN PATENT DOCUMENTS

JP 06000253 A * 1/1994

* cited by examiner

*Primary Examiner* — Dmitry Suhol
*Assistant Examiner* — Jason Yen
(74) *Attorney, Agent, or Firm* — Goldstein Law Offices, P.C.

(57) ABSTRACT

A gaming chip counter, for use counting a plurality of gaming chips, each gaming chip have a known predetermined weight. The gaming chip counter has a housing having a top surface, a front, rear, and sides, with digital total displays thereupon. A plurality of counting elements are located on the top surface arranged in counting zones. For each counting zone, a denomination setting system allows the user to establish a currently set denomination. When chips are stacked upon the counting elements in each counting zone, a zone value is determined by weighing the gaming chips thereupon. A total chip value is determined by summation of the zone values, and displayed on the total displays in real time.

6 Claims, 3 Drawing Sheets

DIGITAL GAMING CHIP COUNTER

UTILITY PATENT APPLICATION

This application relates to subject matter contained in provisional patent application Ser. No. 61/215,507, filed in the United States Patent Office on May 6, 2009.

BACKGROUND OF THE INVENTION

The invention relates to a digital gaming chip counter. More particularly, the invention relates to a device that is used to quickly and easily calculate the total value of a group of gaming chips associated with a player, for prominent display to a player and other players.

Wagering forms an important part in a variety of games, including both card games, and non-card table games such as roulette and craps. Placing a wager puts something "at stake" for the player, such that the outcome becomes more significant, more risky, and thus more interesting and exciting.

At a casino, wagering is the essential, unifying element of all games. While currency would seemingly be a natural wagering device, currency is not the preferred instrument for wagering and payouts of winnings during continued play. Currency provides great opportunities for error, fraud, and theft. In addition it is sometimes said that the use of currency can psychologically deter wagering, since it is 'too real'. Further, the use of chips encourages players to continue playing, and to stay in a game longer. Accordingly, currency is largely replaced in casinos by an element of agreed value: the gaming chip.

Gaming chips are typically manufactured from a rigid and scratch-resistant plastic. The chips have patterns which are varied in design and color in order to reduce the risk of counterfeiting. Often the color schemes and designs are used to clearly distinguish chips of different denominations. These patterns and color schemes are often carried out on both the face and edge of the chip in order to make it easier to identify the chips when they are being handled or stacked on the gambling table.

Gaming chips are provided in casinos in various convenient denominations. Currency is readily exchanged for gaming chips at the casinos, and then the chips are used during the remainder of play. When the player is done playing and wishes to exchange chips for currency, the player brings the chips to a cashier or "cage", where the chips are counted and currency is tendered back to the player.

In certain circumstances, such as during poker tournament play, it is desirable to know how 'much' other players have— in chips, and in corresponding monetary value. It is quite difficult to ascertain, however, without staring and studying, what the value is of a competitive player's chips. And it is virtually impossible to accurately determine the value of another player's chips at a distance of more than a few feet. Accordingly, there is a need for a system for accurately determining the current value of a player's chips.

While these units may be suitable for the particular purpose employed, or for general use, they would not be as suitable for the purposes of the present invention as disclosed hereafter.

SUMMARY OF THE INVENTION

It is an object of the invention to produce a gaming chip counter that allows gaming chips to be quickly and easily counted. Accordingly the present invention counts the chips by weighing them and using the predetermined known weight of an average chip and performing a simple calculation to determine the quantity of chips.

It is another object of the invention to provide a gaming chip counter that quickly and easily determines the value of a stack of chips. Once the quantity of chips is determined, the total value of the chips is thereby calculated and displayed.

It is yet another object of the invention to provide a gaming chip counter that may be used to determine the total value of a group of chips which include chips of different denominations. Accordingly, the counter has several counting zones, each counting zone may be assigned a different denomination. When the chips are sorted appropriately and placed in the correct counting zones, the total value of all chips is displayed by the counter.

It is a further object of the invention to provide a gaming chip counter that can accommodate a significant number of chips of each denomination. Accordingly, each zone may contain more than one counting element. Each counting element can accommodate and weigh a stack of chips of any height that will remain stabile thereupon. The combined weight of all counting elements within a counting zone is used to determine the total value of the chips of that denomination, known as a zone value.

It is a still further object of the invention to provide a counter that can be used to make the value of a player's chips known to all other players in a poker game. Accordingly, a poker player maintains all chips upon the counter. The total chip value of all chips is continuously calculated, and displayed on digital total displays such that the total chip value of the player's chips is visible to all other players.

It is yet a further object of the invention to provide a counter that can work with gaming chips of various weights. Accordingly, a calibration feature allows the gaming chip to be weighed, and the chip weight thereof used in calculating the total value of all similar gaming chips, in accordance with the principles of the present invention.

The invention is a gaming chip counter, for use counting a plurality of gaming chips, each gaming chip have a known predetermined weight. The gaming chip counter has a housing having a top surface, a front, rear, and sides, with digital total displays thereupon. A plurality of counting elements are located on the top surface arranged in counting zones. For each counting zone, a denomination setting system allows the user to establish a currently set denomination. When chips are stacked upon the counting elements in each counting zone, a zone value is determined by weighing the gaming chips thereupon. A total chip value is determined by summation of the zone values, and displayed on the total displays in real time.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
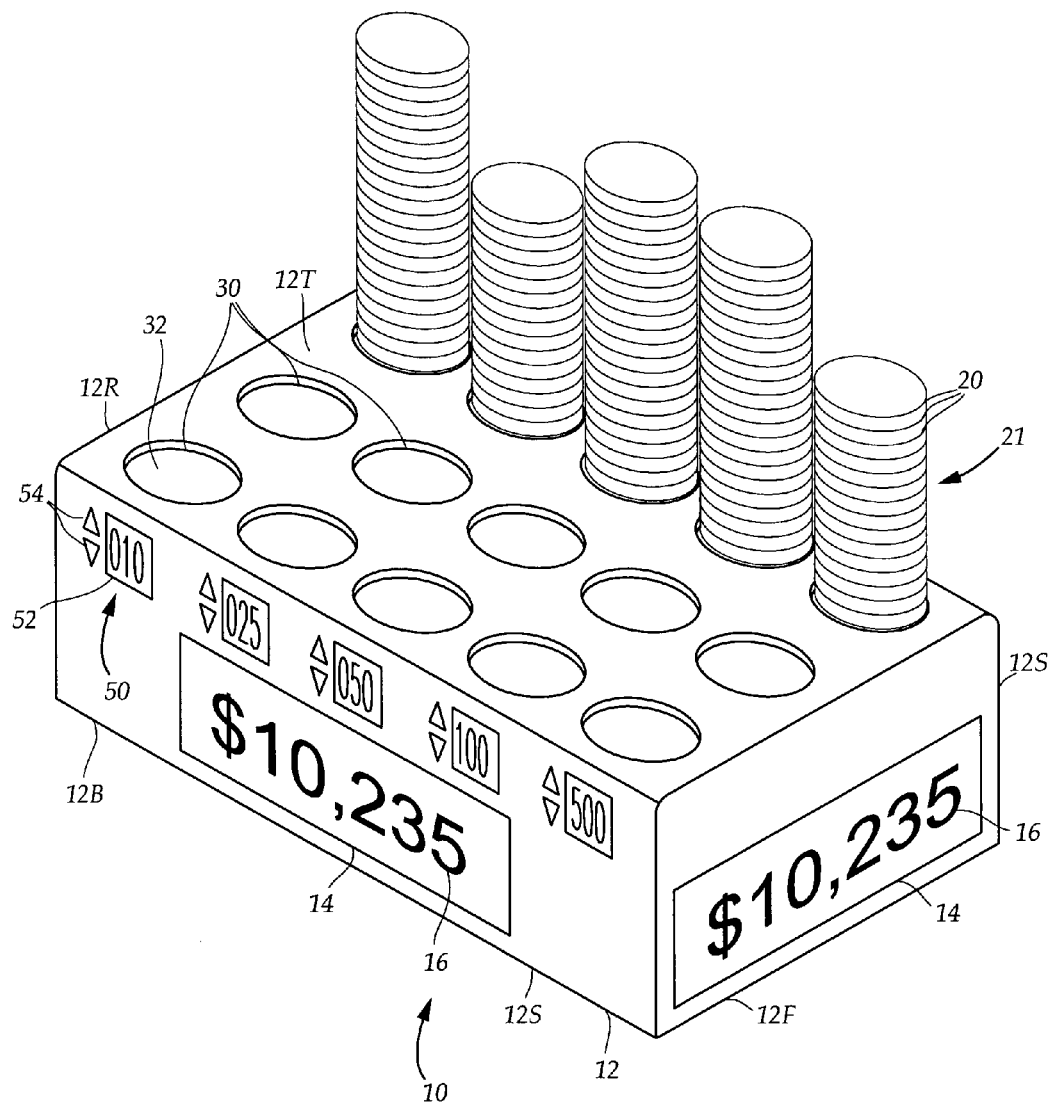
FIG. 1 is a diagrammatic perspective view, illustrating the present invention, per se, in use wherein stacks of gaming chips are piled thereupon, and wherein a total value is indicated a digital display.

FIG. 1 illustrates a gaming chip counter 10, having a housing 12, which includes a top surface 12T, a bottom surface 12B, a front 12F, a rear 12R, and a pair of sides 12S. The gaming chip counter 10 is used for counting gaming chips 20 of various denominations and providing a total monetary amount of the gaming chips 20. The gaming chip counter can work in conjunction with gaming chips 20 that have a predetermined or already known chip weight, and can also work with gaming chips having a custom weight using a calibration feature that will be discussed in further detail hereinbelow.

A digital total display 14 is provided on the housing 12 to be clearly visible to others. The digital total displays 14 are capable of displaying a total chip value 16—representing the total monetary amount represented by the chips—in large clear numerals, up to a predetermined amount, e.g. $10,000,000 or $100,000,000. Accordingly, several total displays 14 are preferably provided on the front 12F, sides 12R, and rear 12R. The total displays 14 all display the same amount for the total chip value 16, so that the total chip value is visible from multiple angles.

The gaming chip counter 10 employs a plurality of counting elements 30. Each counting element 30 has an actuation surface 32 which is recessed slightly beneath the top surface 12T of the housing 12 within an opening only slightly larger than a diameter of the gaming chip 20 immediately over the actuation surface 32 of each counting element, upon which a plurality of gaming chips 20 can be stacked. The plurality of gaming chips 20 piled on top of any particular counting element 30 is known as a chip stack 21. The counting element 30 is capable of precisely weighing the gaming chips 20 stacked upon its actuation surface 32 as a chip stack 21, and determining a stack weight. The counting element 30 determines a stack count by dividing the stack weight by the chip weight.

Figure 2:
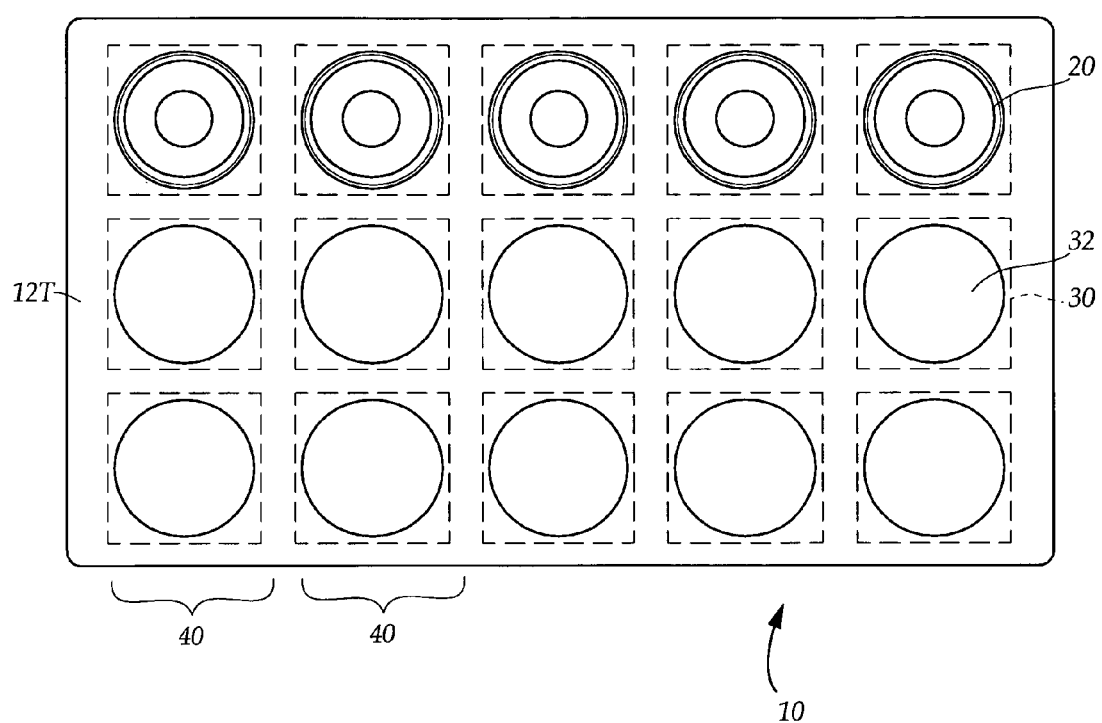
FIG. 2 is a top plan view, thereof.

In accordance with principles of the present invention, and with momentary reference also to FIG. 2, the counter 10 has a plurality of counting zones 40. Each counting zone 40 is for holding and counting chips 20 of the same denomination. Accordingly, a denomination setting system 50 is provided for each zone 40. In the embodiment shown, the denomination setting system 50 includes a denomination display 52 and denomination setting buttons 54. Accordingly, the denomination for the counting zone 40 can be adjusted by the user with the denomination setting buttons 54, using feedback from the denomination display 52—which indicates a currently set denomination. The currently set denomination for each zone can be configured in other ways, including by using a keypad—perhaps located on the bottom 12B of the housing, wirelessly under the control of the casino, using a memory card, dongle, cartridge, or with any other means presently or prospectively known.

For each counting zone 40, at least one and often several counting elements 30 are associated therewith. Accordingly, numerous gaming chips 20 of the same denomination can be accommodated by the use of multiple counting elements 30 within the counting zone 40 assigned to that denomination. According to the expected denominations and quantity of chips to be played, the number of zones can be varied, and the total number of counting elements can be varied within a typical range of 3 to more than 20.

Once the denomination is set for the counting zone 40, a zone value can be determined by adding the stack weight for all counting elements from that counting zone 40. The stack weight is then divided by the predetermined chip weight to determine a stack count. The stack count for that zone is multiplied by the currently set denomination to determine the zone value. The zone value for all other zones are determined in this manner. The total chip value is determined by the summation of all of the zone values thus determined. The total chip value 16 is displayed on the digital total displays 14 in real time. A value cycle is conducted many times per second—more frequently than perceptible by humans. In the value cycle, the stack weights and stack counts are determined for each counting element 30, the zone values are determined, and the total chip value 16 is updated. Accordingly, whenever the player removes or replaces chips, the total chip value 16 is updated in what is perceived by the player to be instantly.

As previously indicated, the counter 10 can be used with gaming chips 20 having a custom weight. According the calibration feature allows the user to set the predetermined chip weight that is employed in determining the stack count from the stack weight. In particular, when in the calibration mode, a single chip or plurality of chips of known quantity are weighed, and the chip weight is determined therefrom for use in the calculation of the stack count, zone value, etc. The user may be prompted through the calibration process using the digital total display and/or denomination displays. Once the chip weight of such representative chips is determined, similar chips can be effectively counted, and the total chip value ascertained therefrom.

Figure 3:
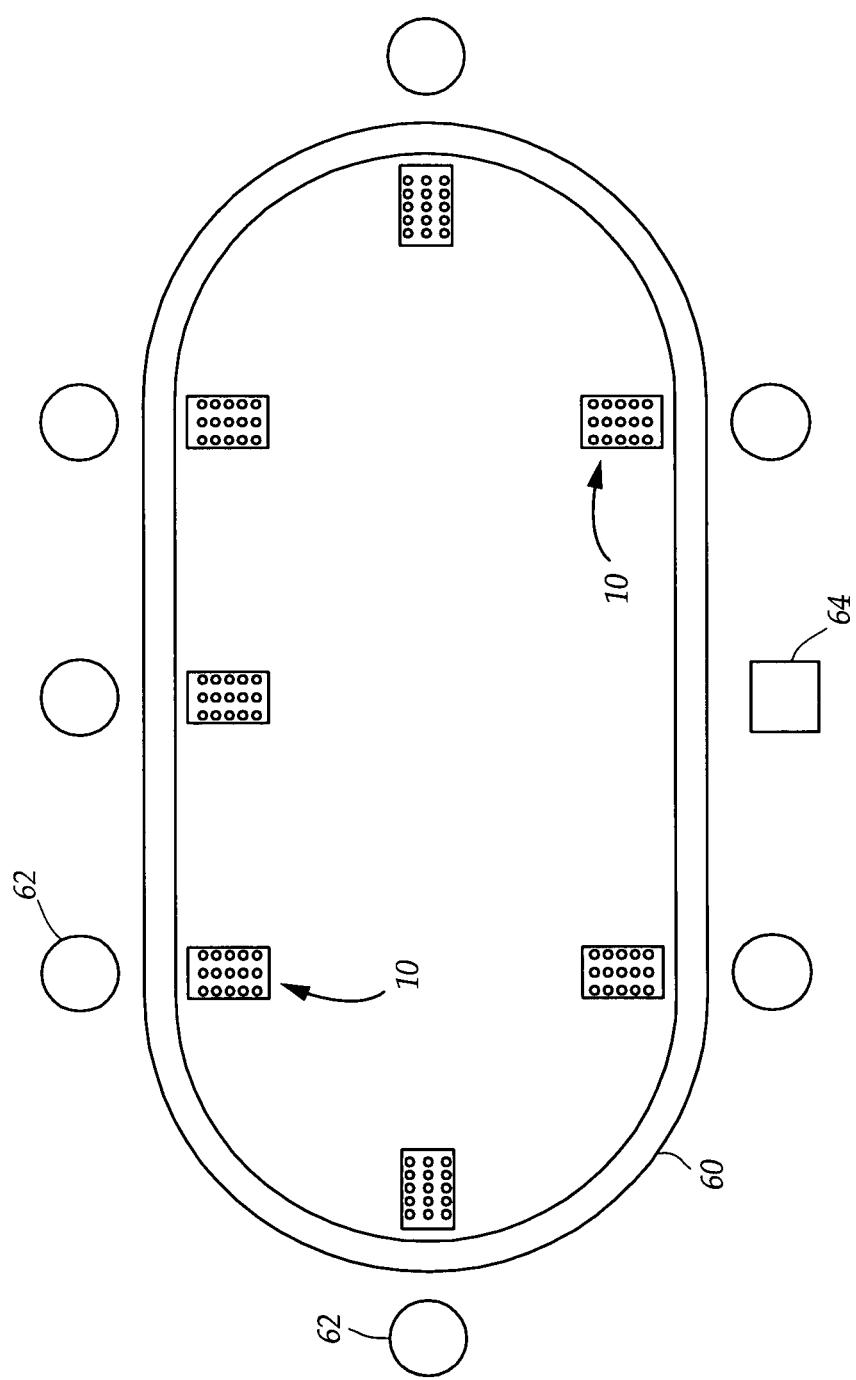
FIG. 3 is a top plan view of the invention in use at a poker table, wherein several gaming chip counters are in use by several players diagrammatically illustrated. One gaming chip counter is associated with each player, for allowing the other players to view the total chip value for each of the other players.

FIG. 3 illustrates the invention in use at a gaming table 60, such as during a poker tournament. A plurality of players 62 are diagrammatically illustrated as positioned around the table 60, along with one dealer 64. One of the gaming chip counters 10 is associated with each player 62, and is positioned on the table 60 immediately in front of said player 62. In accordance with the principles of the present invention, with each player 62 placing/maintaining all associated gaming chips on the top surface of the counter 10 associated with that player 62, the total chip value for each player 62 is easily visible to all other players by observing the gaming chip counter 10 associated with those players.

In conclusion, herein is presented a gaming chip counter, for determining a total value of a plurality of gaming chips of different denominations, and displaying the total value thereupon. The invention is illustrated by example in the drawing figures, and throughout the written description. It should be understood that numerous variations are possible, while adhering to the inventive concept. Such variations are contemplated as being a part of the present invention.

What is claimed is:

1. A gaming chip counter, for counting gaming chips of a game player, each gaming chip having a chip weight and a denomination, and displaying a total chip value for the gaming chips of the player, comprising:

a housing having a top surface, a front, a rear, and a pair of side surfaces;

at least two counting elements, a counting element having an actuation surface accessible at the top surface, each counting element having an associated denomination, for allowing a stack of gaming chips of the same denomination to be placed upon the actuation surface and determining a stack weight of said stack of gaming chips, each counting element located within a counting zone, the counting zone having an associated denomination display, for indicating what denomination chips are to be stacked upon counting elements within said counting zone the denomination for each counting zone selectively set, each counting zone having a plurality of denomination setting buttons for adjusting the denomination for the counting zone; and a digital total display, for displaying the total chip value determined by the sum of the value of chips of each counting element, the value of chips for each counting element determined by dividing the stack weight by the chip weight to determine a stack count and multiplying said stack count by the denomination associated with that counting element, the digital total display located on the front, the rear, and the side surfaces of the housing, to allow other players to easily view the total chip value for the player.

2. The gaming chip counter as recited in claim 1, having at least two counting zones, and wherein each counting zone has at least two counting elements associated therewith.

3. The gaming chip counter as recited in claim 2, wherein the gaming chips each have a diameter, and wherein the actuation surface of each counting element is recessed slightly below the top surface through an opening slightly larger than the diameter of the gaming chip.

4. A gaming chip counter, for counting gaming chips of a game player, each gaming chip having a chip weight and a denomination, and displaying a total chip value for the gaming chips of the player, comprising:

a housing having a top surface, a front surface, a rear surface, and a pair of side surfaces;

at least two counting zones, each counting zone having a denomination, a denomination display, and denomination setting buttons for allowing adjustment of the denomination for that counting zone, each counting zone having at least one counting element, said counting element having an actuation surface accessible at the top surface, for allowing a stack of gaming chips of the same denomination to be placed upon the actuation surface and thereby determining a stack weight of said stack of gaming chips, dividing the stack weight by the chip weight to determine a stack count, and multiplying the stack count by the denomination to determine a zone value; and a digital total display, for displaying the total chip value determined by the sum of all zone values, the digital total display located on the front, the rear, and the side surfaces of the housing, to allow other players to easily view the total chip value for the player.

5. The gaming chip counter as recited in claim 4, wherein each counting zone has at least two counting elements.

6. The gaming chip counter as recited in claim 5, wherein each gaming chip has a diameter, and wherein the top surface has an opening slightly larger than the gaming chip diameter immediately above the actuation surface of each counting element.

* * * * *